United States Patent
Xia et al.

(10) Patent No.: US 11,631,217 B2
(45) Date of Patent: Apr. 18, 2023

(54) DATA PROCESSING METHOD AND ELECTRONIC DEVICE

(71) Applicant: GUANGDONG OPPO MOBILE TELECOMMUNICATIONS CORP., LTD., Guangdong (CN)

(72) Inventors: Yang Xia, Guangdong (CN); Tao Zhang, Guangdong (CN); Kai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 160 days.

(21) Appl. No.: 17/200,177

(22) Filed: Mar. 12, 2021

(65) Prior Publication Data

US 2021/0201568 A1 Jul. 1, 2021

Related U.S. Application Data

(63) Continuation of application No. PCT/CN2019/100842, filed on Aug. 15, 2019.

(30) Foreign Application Priority Data

Sep. 30, 2018 (CN) .......................... 201811161715.X (51) Int. Cl.
*G06T 17/00* (2006.01)
*G06T 5/00* (2006.01)
(Continued)

(52) U.S. Cl.
CPC .............. *G06T 17/00* (2013.01); *G06T 5/009* (2013.01); *G06T 7/0002* (2013.01); *H04N 5/262* (2013.01);
(Continued)

(58) Field of Classification Search
None
See application file for complete search history.

(56) References Cited

U.S. PATENT DOCUMENTS

| 10,015,295 B1* | 7/2018 | Penfold .................. H04N 23/64 |
| 2012/0162366 A1 | 6/2012 | Ninan et al. |
| 2013/0127991 A1* | 5/2013 | Oh ........................ H04N 19/597 |
| | | 348/43 |

FOREIGN PATENT DOCUMENTS

| CN | 102946513 A | 2/2013 |
| CN | 104883504 A | 9/2015 |
| | (Continued) | |

OTHER PUBLICATIONS

Extended European Search Report for EP Application 19866417.9 dated Jun. 28, 2021. (12 pages).
(Continued)

*Primary Examiner* — Yanna Wu
(74) *Attorney, Agent, or Firm* — Young Basile Hanlon & MacFarlane, P.C.

(57) ABSTRACT

Embodiments of the present application provide a data processing method and an electronic device. The data processing method includes: determining whether a current collection scene satisfies a condition for enabling a high-dynamic range (HDR) collection function; automatically enabling the HDR collection function in response to the current collection scene satisfying the condition for enabling the HDR collection function; and collecting at least two two-dimensional images with different exposures within a collection time of one frame of three-dimensional video data based on the HDR collection function; wherein the at least two two-dimensional images are configured to enable a mobile edge computing (MEC) server to build a three-dimensional video.

15 Claims, 6 Drawing Sheets

(51) Int. Cl.
*G06T 7/00* (2017.01)
*H04N 5/262* (2006.01)

(52) U.S. Cl.
CPC ............ *G06T 2207/10016* (2013.01); *G06T 2207/10024* (2013.01); *G06T 2207/10028* (2013.01); *G06T 2207/10144* (2013.01); *G06T 2207/20208* (2013.01); *G06T 2207/30168* (2013.01)

(56) References Cited

FOREIGN PATENT DOCUMENTS

| | | |
|---|---|---|
| CN | 105959566 A | 9/2016 |
| CN | 107613191 A | 1/2018 |
| CN | 107734283 A | 2/2018 |
| CN | 108156390 A | 6/2018 |
| CN | 109194946 A | 1/2019 |
| EP | 2854389 A1 | 4/2015 |
| WO | 2018098096 A1 | 5/2018 |

OTHER PUBLICATIONS

International Search Report with English Translation of International application No. PCT/CN2019/100842 dated Oct. 31, 2019 (9 pages).
First Office Action with English Translation from China patent office in a counterpart Chinese patent Application CN201811161715.X dated Aug. 22, 2019 (14 pages).
Second Office Action with English Translation from China patent office in a counterpart Chinese patent Application CN201811161715.X dated Feb. 21, 2020 (10 pages).
Rejection decision with English Translation of China patent office in a counterpart Chinese patent Application CN201811161715.X dated Jun. 12, 2020 (16 pages).

* cited by examiner

DATA PROCESSING METHOD AND ELECTRONIC DEVICE

CROSS-REFERENCE TO RELATED APPLICATION(S)

The present application is a continuation-application of International (PCT) Patent Application No. PCT/CN2019/100842, filed on Aug. 15, 2019, which claims priority of Chinese Patent Application No. 201811161715.X, filed on Sep. 30, 2018, the entire contents of both of which are hereby incorporated by reference.

TECHNICAL FIELD

The present disclosure relates to but is not limited to the field of information technologies, and in particular to a data processing method and an electronic device.

BACKGROUND

In the process of three-dimensional video modeling, it may be necessary to obtain two-dimensional images and depth images at the same time. However, it is found in the related art that during the process of the three-dimensional modeling based on such two-dimensional images and depth images, modeling failure or abnormal modeling is prone to occur.

SUMMARY

Embodiments of the present disclosure provide a data processing method and an electronic device.

A first aspect of the present disclosure provides a data processing method for a terminal, including: determining whether a current collection scene satisfies a condition for enabling a high-dynamic range (HDR) collection function; automatically enabling the HDR collection function in response to the current collection scene satisfying the condition for enabling the HDR collection function; and collecting at least two two-dimensional images with different exposures within a collection time of one frame of three-dimensional video data based on the HDR collection function; wherein the at least two two-dimensional images are configured to enable a mobile edge computing (MEC) server to build a three-dimensional video.

A second aspect of the present disclosure provides a data processing method, including: determining whether a condition for enabling a high-dynamic range (HDR) collection function of a terminal is satisfied; and in response to the condition for enabling the HDR collection function being satisfied, sending a prompt to the terminal to enable the HDR collection function.

A third aspect of the present disclosure provides an electronic device, including a memory, a processor, and computer instructions stored in the memory and executable by the processor; wherein the computer instructions are executed by the processor to implement operations of the data processing method applied to any one of the terminal and the MEC server.

BRIEF DESCRIPTION OF DRAWINGS

The technical solutions and other beneficial effects of the present disclosure will be apparent through the detailed description of the specific embodiments of the present disclosure in conjunction with the accompanying drawings.

DETAILED DESCRIPTION

Before describing the technical solutions of the embodiments of the present disclosure in detail, a system architecture to which the data processing method of the embodiments of the present disclosure is applied will be briefly described. The data processing method of the embodiments of the present disclosure may be applied to related services of three-dimensional video data. The services may include, for example, a service of sharing three-dimensional video data, or a live broadcast service based on three-dimensional video data, and so on. In this case, due to the large amount of three-dimensional video data, the separately transmitted depth data and two-dimensional video data require higher technical support during the data transmission process. Therefore, the mobile communication network is required for a faster data transmission rate and a more stable data transmission environment.

Figure 1:
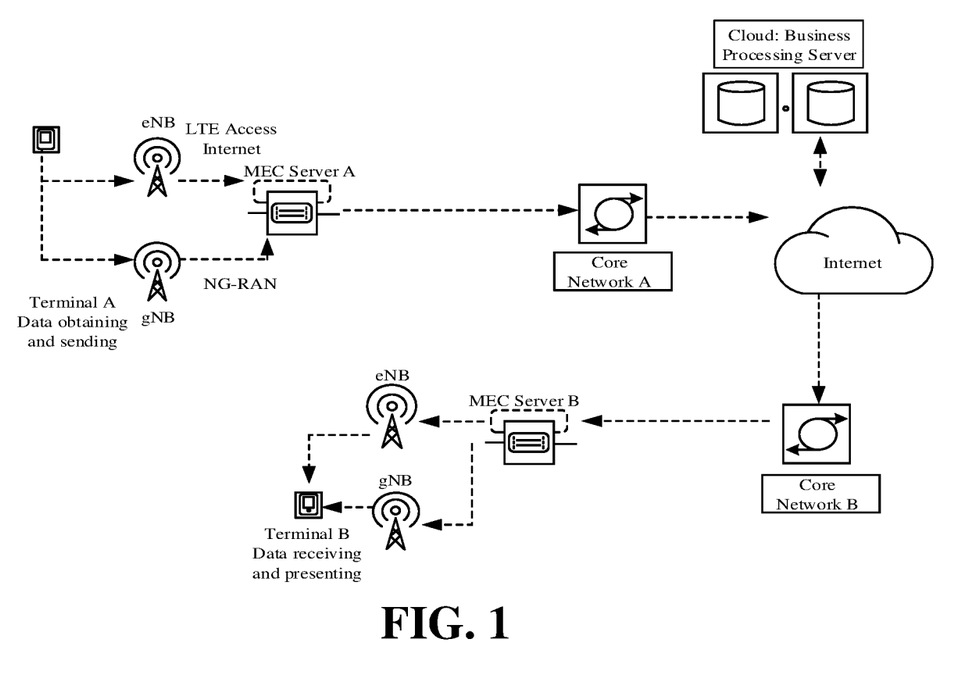
FIG. 1 is system architecture view for an application of a data transmission method according to an embodiment of the present disclosure.

FIG. 1 is system architecture view for an application of a data transmission method according to an embodiment of the present disclosure. As shown in FIG. 1, the system may include a terminal, a base station, a mobile edge computing (MEC) server, a service processing server, a core network, and the Internet. A high-speed channel is established between the MEC server and the service processing server through the core network to achieve data synchronization.

Taking the application scenario in which two terminals interact as shown in FIG. 1 as an example, the MEC server A is an MEC server deployed near the terminal A (sending end), and the core network A is a core network in the area in which the terminal A is located. Accordingly, the MEC server B is a MEC server deployed near the terminal B (receiving end), and the core network B is a core network in the area in which the terminal B is located. A high-speed channel is established between the MEC server A and the service processing server through the core network A to achieve data synchronization. A high-speed channel is established between the MEC server B and the service processing server through the core network B to achieve data synchronization.

After the three-dimensional video data sent by the terminal A is transmitted to the MEC server A, the MEC server A synchronizes the data to the service processing server through the core network A. Then the MEC server B obtains the three-dimensional video data sent by the terminal A from the service processing server and sends the data to the terminal B for presentation.

When the terminal B and the terminal A are transmitted through a same MEC server, then the terminal B and the terminal A directly realize the three-dimensional video data transmission through one MEC server, without the participation of the service processing server. This method is called local return. Specifically, assuming that the terminal B and the terminal A realize the three-dimensional video data transmission through the MEC server A, after the three-dimensional video data sent by the terminal A is transmitted to the MEC server A, the MEC server A sends the three-dimensional video data to the terminal B for presentation.

The terminal may be selected to access an evolved base station (eNB) of the 4G network or a next-generation evolved base station (gNB) of the 5G network based on the network situation, the configuration of the terminal, or the configured algorithm of the terminal. In this way, the eNB may be connected to the MEC server through a long term evolution (LTE) access network, or rather the gNB may be connected to the MEC server through a next-generation access network (NG-RAN).

The MEC server is deployed on the network edge side close to the terminal or the data source. The so-called close to the terminal or the data source refers to not only logically located, but also geographically close to the terminal or the data source. Different from the main service processing server in the existing mobile communication network deployed in several large cities, the MEC server may be deployed in multiple in one city. For example, in cases of an office building with many users, a MEC server may be deployed near the office building.

The MEC server serves as an edge computing gateway converged with core capabilities of networks, computing, storage, and applications, and provides platform support for edge computing including a device domain, a network domain, a data domain, and an application domain. The MEC server connects various types of smart devices and sensors, provides smart connection and data processing services nearby, and allows different types of applications and data to be processed in the MEC server, thereby realizing key intelligent services such as real-time business, business intelligence, data aggregation and interoperation, and security and privacy protection. In this way, the intelligent decision-making efficiency of the business is improved.

Figure 2:
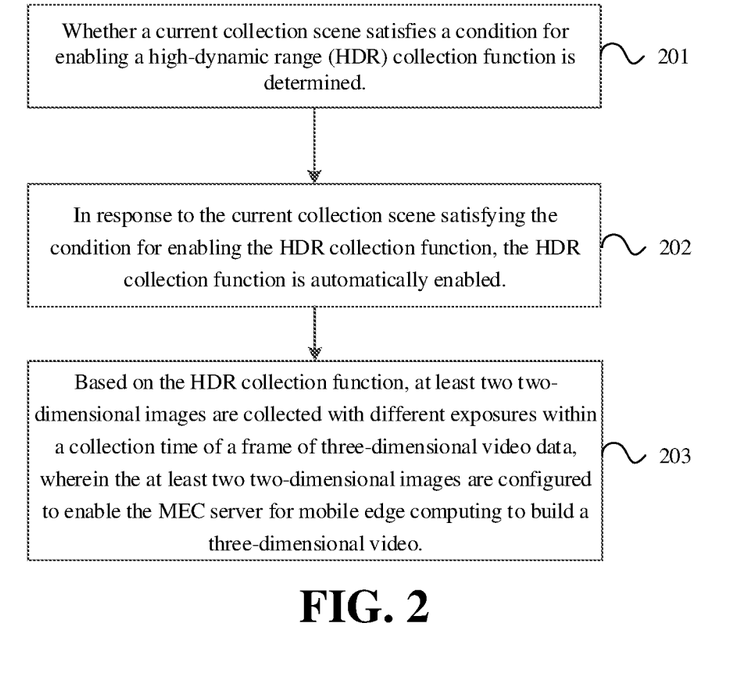
FIG. 2 is a flow chart of a data processing method according to an embodiment of the present disclosure.

As shown in FIG. 2, an embodiment provides a data processing method, which is applied to a terminal and includes operations as followed.

At block 201: Whether a current collection scene satisfies a condition for enabling a high-dynamic range (HDR) collection function is determined.

At block 202: In response to the current collection scene satisfying the condition for enabling the HDR collection function, the HDR collection function is automatically enabled.

At block 203: Based on the HDR collection function, at least two two-dimensional images are collected with different exposures within a collection time of a frame of three-dimensional video data, wherein the at least two two-dimensional images are configured to enable the MEC server for mobile edge computing to build a three-dimensional video.

The three-dimensional video data may include: a two-dimensional image and a depth image. The two-dimensional image contains color pixels. A pixel value of each color pixel is a color value. For example, the color value is a red/green/blue (RGB) value or a brightness/chroma/density (YUV) value.

The depth image includes depth pixels. A pixel value of each depth pixel is a depth value. The three-dimensional video data and the depth image can construct a three-dimensional image in a three-dimensional image space.

In some embodiments, image sizes of the two-dimensional image and the depth image are the same. For example, the pixels included in the two-dimensional image and the depth image are both W×H; where W represents the number of pixels included in a first direction, H represents the number of pixels included in a second direction. Both W and H are positive integers.

In some embodiments, the two-dimensional image and the depth image may be two images collected at the same time. In order to reduce the amount of data, the image sizes of the two-dimensional image and the depth image satisfy a preset relationship. For example, the pixels included in the two-dimensional image are W×H, and the pixels included in the depth image are (W/a)×(H/b). In this way, one depth pixel corresponds to a×b color pixels. When building a three-dimensional video, the pixel value of one depth pixel may be applied to the pixel values of a×b adjacent color pixels. For example, (W/a)×(H/b) is equal to (W/2)×(H/2). In this way, one depth pixel corresponds to 4 color pixels. When building a three-dimensional video, the pixel value of one depth pixel may be applied to the pixel values of 4 adjacent color pixels. In this way, the amount of image data of the depth image is reduced. Generally, the unevenness in a small area adjacent to an object is basically the same, so when the image size of the depth image is smaller than the image size of the two-dimensional image, the restoration and construction of the three-dimensional video with higher accuracy may be maintained. Moreover, the amount of data that the terminal and the MEC server need to interact and/or the amount of data that the MEC server needs to process may be reduced.

In some embodiments, when the size of the depth image is smaller than that of the two-dimensional image, at least one of the following ways may be applied: collecting the depth image directly based on the image size of the depth image; collecting the original depth image based on the image size of the two-dimensional image; and generating the depth image based on the image size of the depth image and the pixel values of the adjacent a×b pixels. For example, the depth image is generated based on an average or a median value of the pixel values of the adjacent a×b pixels.

In the embodiments, in order to save power consumption and resources of the terminal, the HDR collection function is turned off by default. When collecting the three-dimensional video data, HDR automatically determines whether the condition for enabling the HDR collection function is satisfied.

When the current collection scene satisfies the condition for enabling the HDR collection function, the HDR collection function is automatically enabled. Once the HDR collection function is enabled, the terminal will collect multiple two-dimensional images with different exposures within the collection time of one frame of three-dimensional video data. In this way, the multiple two-dimensional images with different exposure levels may be obtained.

In this way, when building the three-dimensional video, one of the multiple two-dimensional images, which satisfies the current three-dimensional video modeling requirement, may be selected to build the three-dimensional video, thereby reducing the probability of three-dimensional video modeling failure or poor accuracy, and improving the success rate and accuracy of the three-dimensional video modeling.

Figure 3A:
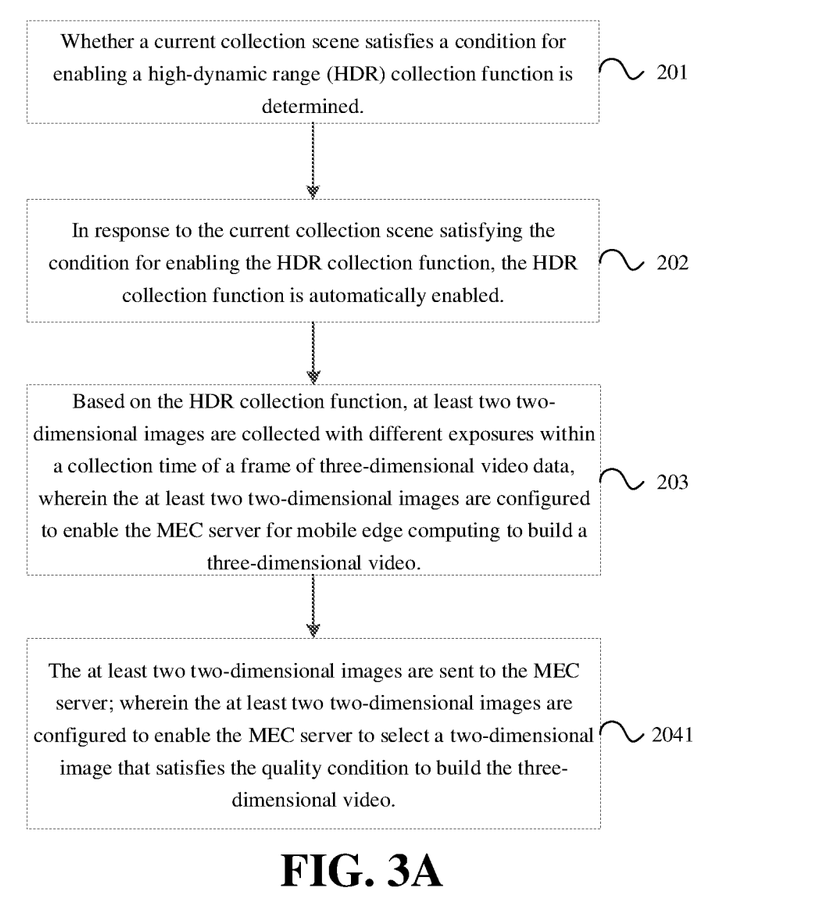
FIG. 3A is a flow chart of a data processing method according to another embodiment of the present disclosure.

In some embodiments, as shown in FIG. 3A, the method further includes operations as followed.

At block 2041: The at least two two-dimensional images are sent to the MEC server; wherein the at least two two-dimensional images are configured to enable the MEC server to select a two-dimensional image that satisfies the quality condition to build the three-dimensional video.

In this way, the collected two-dimensional images are sent to the MEC server, and the MEC server selects the two-dimensional image that satisfies the quality condition to build the three-dimensional video.

Figure 3B:
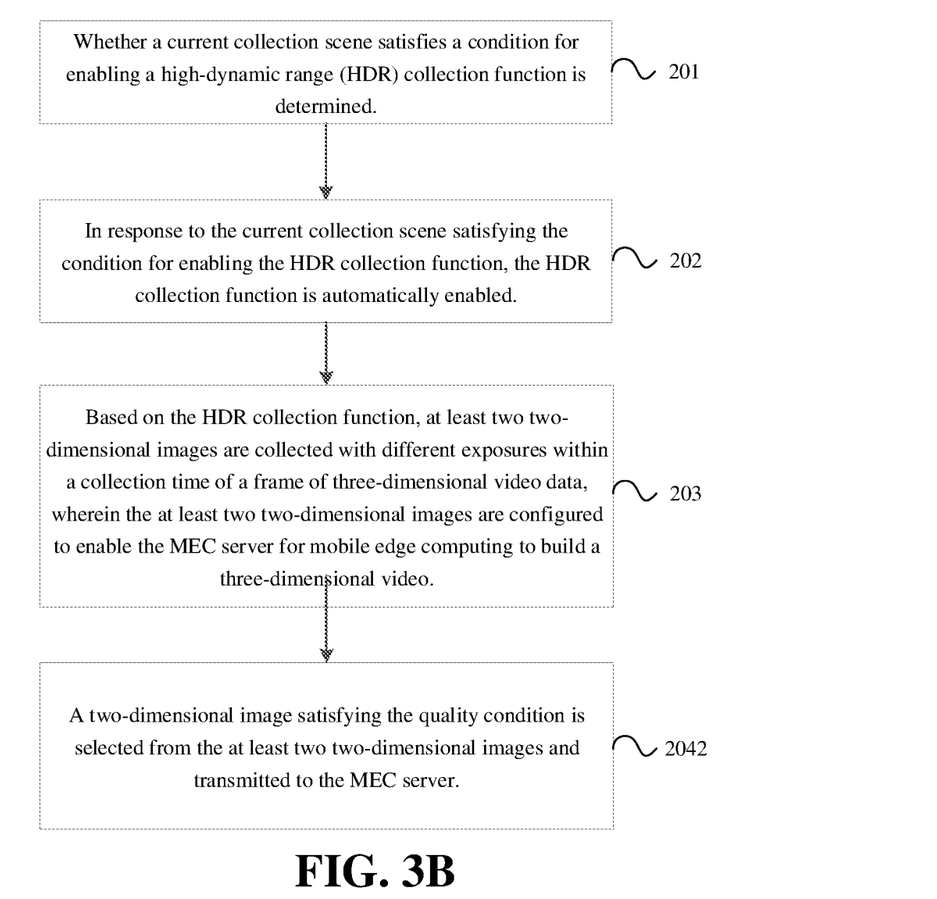
FIG. 3B is a flow chart of a data processing method according to further another embodiment of the present disclosure.

In other embodiments, as shown in FIG. 3B, the method further includes operations as followed.

At block 2042: A two-dimensional image satisfying the quality condition is selected from the at least two two-dimensional images and transmitted to the MEC server.

In the embodiment, the terminal selects the two-dimensional image satisfying the quality condition, and transmits only the two-dimensional image satisfying the quality condition to the MEC server.

The two-dimensional image that satisfies the quality condition may be: a two-dimensional image with a contrast greater than a preset contrast threshold; and/or, a two-dimensional image with a sharpness greater than a preset sharpness threshold.

In some embodiments, the operation 201 may include: in response to a prompt to enable the HDR collection function being received from the MEC server, determining that the current collection scene satisfies the condition for enabling the HDR collection function.

When the prompt to enable the HDR collection function is received from the MEC server, indicating that the HDR collection function is currently required to be enabled, the terminal will switch the HDR collection function from an off state to an on state.

In some embodiments, there are a number of enabling prompts from the MEC server, and two optional prompts are provided as followed.

I. When a prompt indicating that an outline of a target in the three-dimensional video is abnormal is received from the MEC server, the current collection scene is determined to satisfy the condition for enabling the HDR collection function.

II. When a prompt indicating that a color of the target in the three-dimensional video is abnormal is received from the MEC server, the current collection scene is determined to satisfy the condition for enabling the HDR collection function.

For example, taking the target as a person for example, the outline of the target may include: a face outline and/or a body outline. The MEC server may determine whether the currently target has abnormal outline through an outline recognition. For example, when there is only one eye recognized in the human face, it can be considered that the outline of the target is abnormal.

For another example, taking the target as a person for example, a condition for determining the abnormal color of the target may include: a color that should not appear on the face appearing on the face; and/or, a color difference on the face exceeding a color difference threshold. For example, when a halo appeared on a yellow face, the color may be considered abnormal.

The above is an example in which the target is a human face. The target may be a human face in specific implementation. The prompts in the above-mentioned I and/or II option may also be called as a first prompt and a second prompt respectively.

When an abnormality occurs, the terminal will receive a prompt sent by the MEC server. When the abnormality corresponding to the prompt can be alleviated or resolved by enabling the HDR collection function, it can be considered that the condition for enabling the HDR collection function is satisfied, and the terminal will automatically enable the HDR collection function.

The enabling prompt sent from the MEC server is not limited to the above-mentioned I and/or II option. In other embodiments, the three-dimensional video developed by the MEC server is normal, with no outline abnormalities or color abnormalities. However, when the MEC server tends to build a better three-dimensional video, the terminal may also receive a third prompt sent by the MEC server.

In some embodiments, the terminal may also determine whether the enabling condition is satisfied. For example, the operation 201 may include: obtaining ambient lighting information of the current collection scene; and in response to the ambient lighting information indicating that ambient lighting is outside a preset range, determining that the current collection scene satisfies the condition for enabling the HDR collection function.

The terminal may collect the ambient light information of the current collection scene. For example, the ambient light information may be: an ambient light intensity value and/or an ambient light brightness value and other information characterizing the ambient light intensity.

When the ambient light in the current collection scene is too strong or too weak, the collection of two-dimensional images may be affected, and it can be considered that the ambient light is outside the preset range. For example, when the ambient light intensity is greater than a maximum collection light intensity, or when the ambient light intensity is less than a minimum collection light intensity, the ambient light is considered to be outside the preset range.

In still other embodiments, a two-dimensional image sample may be collected, when the two-dimensional image sample includes imaging of a light source (such as, imaging of the sun or imaging of light), the ambient lighting is also considered to be outside the preset range.

Therefore, in the embodiments, the terminal may determine whether the ambient light information satisfies the preset lighting condition, and then determine whether the HDR collection function is required.

In some embodiments, the operation 203 may include: based on the HDR collection function, collecting the at least two two-dimensional images with an exposure aperture of a same size and with different exposure times within the collection time of a frame of the three-dimensional video data;

In some other embodiments, the operation 203 may include: based on the HDR collection function, collecting the at least two two-dimensional images with the exposure aperture of different sizes and with the same exposure time within the collection time of a frame of the three-dimensional video data.

The HDR applies multiple exposures to collect a number of two-dimensional images.

In the embodiments, the exposure aperture may be the aperture size of an aperture. The larger the aperture size of the aperture, the greater the amount of exposure obtained at a moment. When the size of the exposure aperture is constant, the longer the exposure time, the greater the exposure. The two-dimensional images with different exposures may be thus collected in at least two above ways.

In other embodiments, the method further includes operations as followed.

An exposure command returned by the MEC server based on the at least two two-dimensional images is received. The exposure command contains information that indicates the amount of exposure. For example, an image serial number and/or an exposure value in each of the at least two two-dimensional images. The image serial number is a serial number of the two-dimensional image selected by the MEC server for building the three-dimensional video. The exposure value may be determined based on the two-dimensional image selected for building the three-dimensional video.

The HDR collection function is turned off according to the exposure command.

Based on the exposure command, the two-dimensional images of the three-dimensional video data are continued to collect.

In this way, the terminal may reduce the collection of two-dimensional images subsequently. Moreover, it can also ensure that the collected two-dimensional images can be configured to enable to MEC server to successfully build the three-dimensional video.

Figure 4:
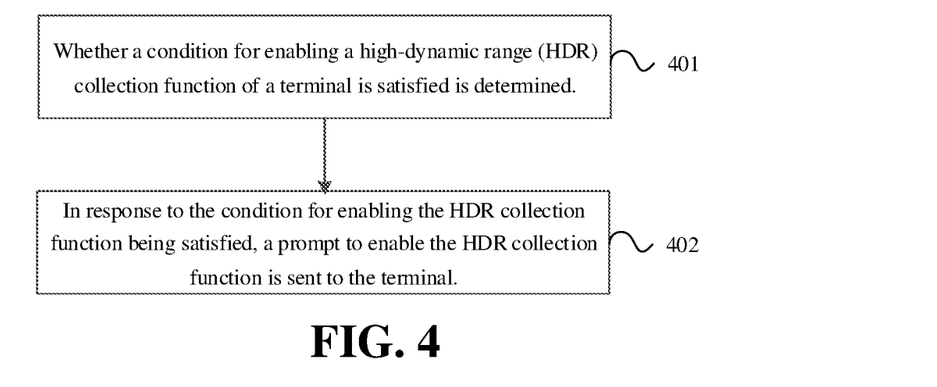
FIG. 4 is a flow chart of a data processing method according to yet another embodiment of the present disclosure.

As shown in FIG. 4, an embodiment provides a data processing method, including operations as followed.

At block 401: Whether a condition for enabling a high-dynamic range (HDR) collection function of a terminal is satisfied is determined.

At block 402: In response to the condition for enabling the HDR collection function being satisfied, a prompt to enable the HDR collection function is sent to the terminal.

In some embodiments, the method further includes: receiving three-dimensional video data from the terminal before the determining whether the condition for enabling the HDR collection function of the terminal is satisfied; and building a three-dimensional video based on the three-dimensional video data.

The operation 401 may include: determining whether a target in the three-dimensional video is abnormal; and in response to the target being abnormal, determining that the condition for enabling the HDR collection function of the terminal is satisfied.

The determining whether the target in the three-dimensional video is abnormal may include at least one of: in response to an outline of the target in the three-dimensional video being abnormal, sending the prompt to the terminal; and in response to a color of the target in the three-dimensional video being abnormal, sending the prompt to the terminal.

Figure 5:
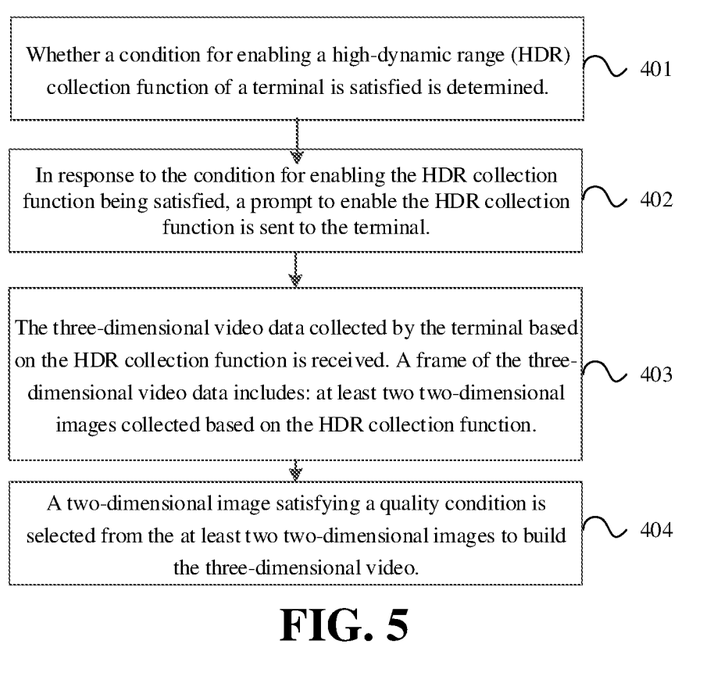
FIG. 5 is a flow chart of a data processing method according to yet another embodiment of the present disclosure.

In some embodiments, as shown in FIG. 5, the method further includes operations as followed.

At block 403: The three-dimensional video data collected by the terminal based on the HDR collection function is received. A frame of the three-dimensional video data includes: at least two two-dimensional images collected based on the HDR collection function.

At block 404: A two-dimensional image satisfying a quality condition is selected from the at least two two-dimensional images to build the three-dimensional video.

In other embodiments, the method further includes: receiving the two-dimensional image that satisfies the quality condition from the terminal; and building the three-dimensional video based on the received two-dimensional image.

Figure 6:
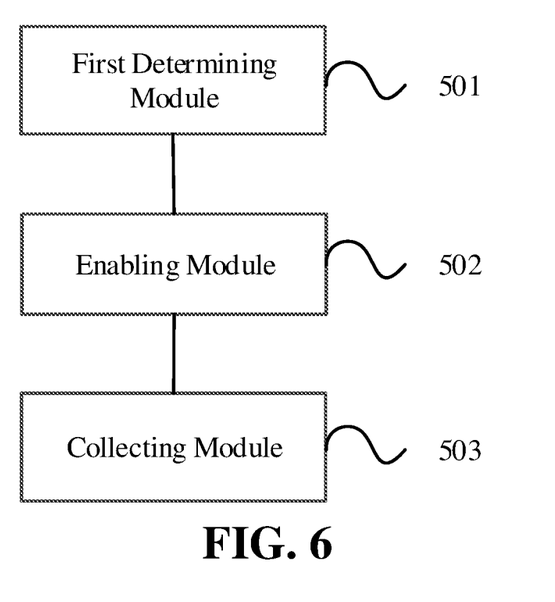
FIG. 6 is a structural schematic view of a data processing apparatus according to an embodiment of the present disclosure.

As shown in FIG. 6, an embodiment provides a data processing apparatus, which is applied to a terminal and includes elements as followed.

A first determining module 501 is configured to determine whether a current collection scene satisfies a condition for enabling a high-dynamic range (HDR) collection function.

An enabling module 502 is configured to automatically enable the HDR collection function in response to the current collection scene satisfying the condition for enabling the HDR collection function.

A collecting module 503 is configured to collect at least two two-dimensional images with different exposures within a collection time of a frame of three-dimensional video data based on the HDR collection function, wherein the at least two two-dimensional images are configured to enable the MEC server for mobile edge computing to build a three-dimensional video.

In some embodiments, the first determining module 501, the enabling module 502, and the collecting module 503 may be program modules corresponding to computer-executable code. After the computer-executable code is executed, pixel-encoded data and the three-dimensional data can be realized Send video data.

In other embodiments, the first determining module 501, the enabling module 502, and the collecting module 503 may be program modules or a combination of hardware modules and program modules, such as a complex programmable array or a field programmable array.

In still other embodiments, the first determining module 501, the enabling module 502, and the collecting module 503 may be program modules corresponding to hardware modules. For example, the first determining module 501, the enabling module 502, and the collecting module 503 may be specific integrated circuits.

In some embodiments, the device further includes: a first selecting module, configured to send the at least two two-dimensional images to the MEC server, wherein the at least two two-dimensional images are configured to enable the MEC server to select a two-dimensional image that satisfies the quality condition to build the three-dimensional video. In still other embodiments, the device further includes:

A first sending module, configured to send the at least two two-dimensional images to the MEC server, wherein the at least two two-dimensional images are configured to enable the MEC server to select a two-dimensional image that satisfies the quality condition to build the three-dimensional video.

In still other embodiments, the first determining module 501 is configured to, in response to a prompt to enable the HDR collection function being received from the MEC server, determine that the current collection scene satisfies the condition for enabling the HDR collection function.

In still other embodiments, the first determining module 501 is further configured to obtain ambient lighting information of the current collection scene; in response to the ambient lighting information indicating that ambient lighting being outside a preset range, determine that the current collection scene satisfies the condition for enabling the HDR collection function.

In still other embodiments, the collecting module 503 is configured to, based on the HDR collection function, collect the at least two two-dimensional images with an exposure aperture of a same size and with different exposure times within the collection time of a frame of the three-dimensional video data; or, the collecting module 503 is configured to, based on the HDR collection function, collect the at least two two-dimensional images with the exposure aperture of different sizes and with the same exposure time within the collection time of a frame of the three-dimensional video data.

Figure 7:
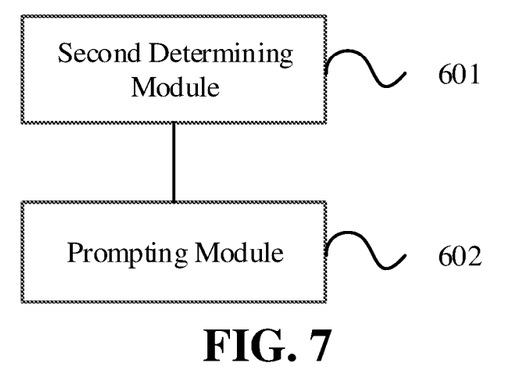
FIG. 7 is a structural schematic view of a data processing apparatus according to another embodiment of the present disclosure.

As shown in FIG. 7, an embodiment provides a data processing apparatus, including elements as followed.

A second determining module 601 is configured to determine whether a condition for enabling a high-dynamic range (HDR) collection function of a terminal is satisfied.

A prompting module 602 is configured to send a prompt to enable the HDR collection function to the terminal in response to the condition for enabling the HDR collection function being satisfied.

In some embodiments, the second determining module 601 and the prompting module 602 may be program modules corresponding to computer-executable code. After the computer-executable code is executed, the aforementioned pixel-encoded data and three-dimensional data can be realized Send video data.

In other embodiments, the second determining module 601 and the prompting module 602 may be program modules or a combination of hardware modules and program modules, such as a complex programmable array or a field programmable array.

In still other embodiments, the second determining module 601 and the prompting module 602 may be program modules corresponding to hardware modules. For example, the second determining module 601 and the prompting module 602 may be specific integrated circuits.

Based on the above solution, the device further includes elements as followed.

A second sending module is configured to receive three-dimensional video data from the terminal before the determining whether the condition for enabling the HDR collection function of the terminal is satisfied.

A modeling module is configured to build a three-dimensional video based on the three-dimensional video data.

The second determining module includes: a first determining sub-module, configured to determine whether a target in the three-dimensional video is abnormal; and a second determining sub-module, configured to determine that the condition for enabling the HDR collection function of the terminal is satisfied in response to the target being abnormal.

In still other embodiments, the device further includes:

A receiving module, configured to receive the three-dimensional video data collected by the terminal based on the HDR collection function, wherein a frame of the three-dimensional video data includes: at least two two-dimensional images collected based on the HDR collection function;

A modeling module, configured to select the two-dimensional image satisfying the quality condition from the at least two two-dimensional images to build the three-dimensional video.

An embodiment provides a computer-readable storage medium storing computer instructions. When the instructions are executed by a processor, the operations of the data processing method applied to the terminal or the MEC server are implemented, for example, one or more of the methods as shown in FIG. 2 or FIG. 4.

Figure 8:
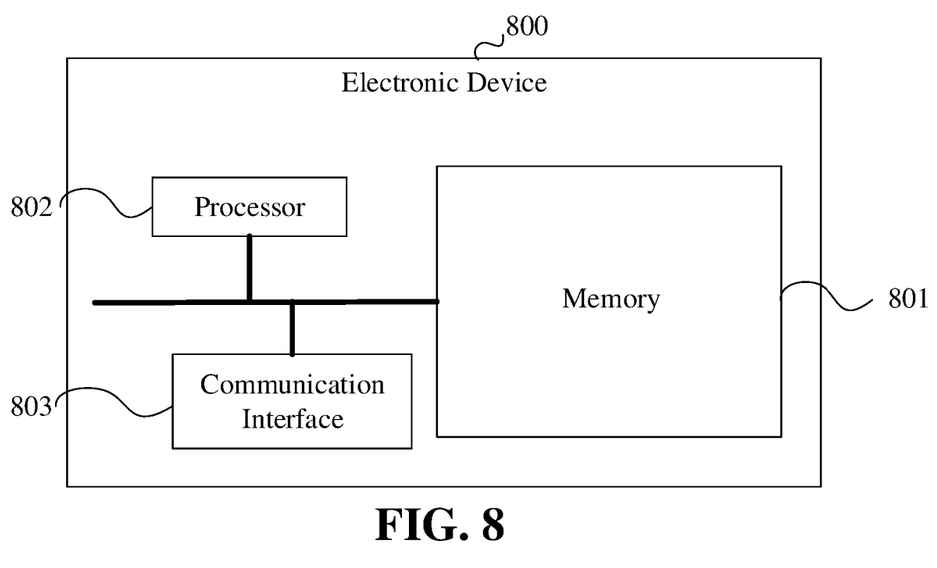
FIG. 8 is a structural schematic view of an electronic device according to an embodiment of the present disclosure.

As shown in FIG. 8, an embodiment provides an electronic device 800, including a memory 801, a processor 802, and computer instructions stored in the memory 801 and executable by the processor 802. When the instructions are executed by the processor 802, the operations of the data processing method applied to the terminal or the MEC server are implemented, for example, one or more of the methods as shown in FIG. 2 to FIG. 5.

In some embodiments, the electronic device further includes a communication interface 803, configured to interact information with other devices. For example, when the MEC server is a terminal, the communication interface 803 can at least interact information with another MEC server. When the MEC server is an MEC server, the communication interface 803 can at least interact information with another terminal.

The following provides a specific example in combination with any of the above embodiments.

When the effect of three-dimensional video modeling is very poor, it is manifested in:

1: The effect of the outline of the target in the three-dimensional video is poor;

2: The fill color patch of the target in the three-dimensional video is poor.

This example provides a data processing method, including operations as followed.

The terminal disables the HDR collection function by default; when the RGB information is inaccurate due to backlighting, the HDR is automatically enabled, and an image with better quality is selected as the RGB image to pair with the depth image; the RGB image is transmitted to the MEC server to enable the MEC server to select from the at least two two-dimensional images, such as 1 from 3, 1 from N, etc.

In the several embodiments provided in the present disclosure, it should be understood that the disclosed method and smart device may be implemented in other ways. The device embodiments described above are only schematic. For example, the division of the units is only a division of logical functions. In actual implementation, there may be another division manner, for example, multiple units or components may be combined, or integrated into another system, or some features can be ignored, or not implemented. In addition, the coupling or direct coupling or communication connection between the displayed or discussed components may be through some interfaces, indirect coupling or communication connection of devices or units may be electrical, mechanical, or of other forms.

The units described as separate components may or may not be physically separated. The components displayed as units may or may not be physical units, that is, they may be located in one place or distributed to multiple network units. Some or all of the units may be selected according to actual needs to achieve the purpose of the solution of the present disclosure.

In addition, the functional units in the embodiments of the present disclosure may all be integrated into one second processing unit, or each unit may be separately used as a unit, or two or more units may be integrated into one unit. The above integrated unit can be implemented in the form of hardware, or in the form of hardware and software functional units.

Those skilled in the art may understand that all or part of the operations to implement the above method embodiments may be completed by program instructions related hardware.

The foregoing program may be stored in a computer-readable storage medium. When the program is executed, the operations of the above method embodiments are included. The foregoing storage medium includes various media that can store program codes, such as a mobile storage device, ROM, RAM, magnetic disk, or optical disk.

Alternatively, when the integrated unit described above is implemented in the form of a software function module and sold or used as an independent product, it may also be stored in a computer-readable storage medium. Based on this understanding, the technical solutions of the embodiments of the present disclosure can be embodied in the form of software products in essence or part of contributions to the prior art. The computer software product is stored in a storage medium and includes several instructions for a computer device (which may be a personal computer, a server, or a network device, etc.) to execute all or part of the methods described in the embodiments of the present disclosure. The foregoing storage medium includes various media that can store program codes, such as mobile storage devices, ROM, RAM, magnetic disks, or optical disks.

It should be noted that the technical solutions described in the embodiments of the present disclosure can be arbitrarily combined without conflict.

The above is only the specific implementation of the present disclosure, but the scope of the present disclosure is not limited to this. Those skilled in the art can easily think of changes or replacements within the technical scope disclosed in the present disclosure, which should also be covered by the scope of the present disclosure.

What is claimed is:

1. A data processing method for a terminal, comprising:
   determining whether a current collection scene satisfies a condition for enabling a high-dynamic range (HDR) collection function;
   automatically enabling the HDR collection function in response to the current collection scene satisfying the condition for enabling the HDR collection function; and
   collecting at least two two-dimensional images with different exposures within a collection time of one frame of three-dimensional video data based on the HDR collection function; wherein the at least two two-dimensional images are configured to enable a mobile edge computing (MEC) server to build a three-dimensional video.

2. The method according to claim 1, further comprising: sending the at least two two-dimensional images to the MEC server; wherein the at least two two-dimensional images are configured to enable the MEC server to select a two-dimensional image that satisfies a quality condition to build the three-dimensional video.

3. The method according to claim 1, further comprising:
   selecting a two-dimensional image satisfying a quality condition from the at least two two-dimensional images; and
   transmitting the two-dimensional image to the MEC server.

4. The method according to claim 2, wherein the two-dimensional image that satisfies the quality condition is at least one of a two-dimensional image with a contrast greater than a preset contrast threshold; and a two-dimensional image with a sharpness greater than a preset sharpness threshold.

5. The method according to claim 1, wherein the determining whether the current collection scene satisfies the condition for enabling the HDR collection function comprises:
   in response to a prompt to enable the HDR collection function being received from the MEC server, determining that the current collection scene satisfies the condition for enabling the HDR collection function.

6. The method according to claim 5, wherein the determining whether the current collection scene satisfies the condition for enabling the HDR collection function further comprises at least one of:
   in response to a first prompt indicating that an outline of a target in the three-dimensional video is abnormal being received from the MEC server, determining that the current collection scene satisfies the condition for enabling the HDR collection function; or
   in response to a second prompt indicating that a color of the target in the three-dimensional video is abnormal being received from the MEC server, determining that the current collection scene satisfies the condition for enabling the HDR collection function.

7. The method according to claim 6, wherein the determining whether the current collection scene satisfies the condition for enabling the HDR collection function further comprises:
   in response to the three-dimensional video being normal and the MEC server requiring the three-dimensional video with a better quality, receiving a third prompt from the MEC server and determining that the current collection scene satisfies the condition for enabling the HDR collection function.

8. The method according to claim 1, wherein the determining whether the current collection scene satisfies the condition for enabling the HDR collection function comprises:
   obtaining ambient lighting information of the current collection scene; and
   in response to the ambient lighting information indicating that ambient lighting of the current collection scene is outside a preset range, determining that the current collection scene satisfies the condition for enabling the HDR collection function.

9. The method according to claim 8, wherein whether the ambient lighting of the current collection scene is outside a preset range is determined by:
   collecting a two-dimensional image sample; and
   in response to the two-dimensional image sample comprising imaging of a light source, determining the ambient lighting of the current scene to be outside the preset range.

10. The method according to claim 8, wherein whether the ambient lighting of the current collection scene is outside a preset range is determined by light intensity.

11. The method according to claim 1, wherein the collecting the at least two two-dimensional images with different exposures within the collection time of one frame of the three-dimensional video data based on the HDR collection function comprises:
   based on the HDR collection function, collecting the at least two two-dimensional images with an exposure aperture of a same size and with different exposure times within the collection time of one frame of the three-dimensional video data; or
   based on the HDR collection function, collecting the at least two two-dimensional images with the exposure aperture of different sizes and with a same exposure time within the collection time of one frame of the three-dimensional video data.

12. The method according to claim 1, further comprising:
receiving an exposure command returned by the MEC server based on the at least two two-dimensional images, the exposure command containing information indicating an amount of exposure of the at least two two-dimensional images; and
disabling the HDR collection function or continuing to collect the at least two two-dimensional images based on the exposure command.

13. The method according to claim 1, wherein the three-dimensional video data collected by the HDR collection function comprises a two-dimensional image and a depth image; and
wherein an image size of the two-dimensional image and an image size of the depth image are the same or satisfy a preset relationship.

14. An electronic device, comprising a memory, a processor, and computer instructions stored in the memory and executable by the processor; wherein the computer instructions are executed by the processor to implement one of operations of:

automatically enabling a high-dynamic range (HDR) collection function in response to a current collection scene satisfying a condition for enabling the HDR collection function; collecting at least two two-dimensional images with different exposures within a collection time of one frame of three-dimensional video data based on the HDR collection function; wherein the at least two two-dimensional images are configured to enable a mobile edge computing (MEC) server to build a three-dimensional video; or
sending a prompt to a terminal to enable the HDR collection function in response to the condition for enabling the HDR collection function being satisfied.

15. The electronic device according to claim 14, wherein whether the current collection scene satisfies the condition for enabling the HDR collection function is determined by one of:
receiving a prompt indicating to enable the HDR collection function from the MEC server; or
obtaining ambient lighting information indicating that ambient lighting of the current collection scene is outside a preset range.

* * * * *